US012594209B2

(12) United States Patent
Parvizi et al.

(10) Patent No.: US 12,594,209 B2
(45) Date of Patent: Apr. 7, 2026

(54) LUMBER AND KNEE RECOVERY DEVICE

(71) Applicants: Ali Parvizi, Tehran (IR); Ayat Parvizi, Tehran (IR)

(72) Inventors: Ali Parvizi, Tehran (IR); Ayat Parvizi, Tehran (IR)

( * ) Notice: Subject to any disclaimer, the term of this patent is extended or adjusted under 35 U.S.C. 154(b) by 63 days.

(21) Appl. No.: 18/401,425

(22) Filed: Dec. 30, 2023

(65) Prior Publication Data

US 2024/0342038 A1 Oct. 17, 2024

Related U.S. Application Data

(63) Continuation-in-part of application No. PCT/IB2022/051262, filed on Feb. 12, 2022.

(60) Provisional application No. 63/216,540, filed on Jun. 30, 2021.

(51) Int. Cl.
*A61H 1/02* (2006.01)

(52) U.S. Cl.
CPC ........... *A61H 1/0222* (2013.01); *A61H 1/024* (2013.01); *A61H 2001/0233* (2013.01); *A61H 2201/1633* (2013.01); *A61H 2201/1652* (2013.01); *A61H 2201/1664* (2013.01); *A61H 2201/1676* (2013.01); *A61H 2201/5023* (2013.01); *A61H 2203/045* (2013.01)

(58) Field of Classification Search
CPC .. A61H 2203/045; A61H 1/02; A61H 1/0218; A61H 1/0222; A61H 1/0292; A61H 2201/0203; A61H 2201/1657; A61H 2201/1664; A61H 2201/1666; A61H 2201/1671; A61H 2201/1673; A61H 2201/1676; A61H 2201/0425
See application file for complete search history.

(56) References Cited

U.S. PATENT DOCUMENTS

| | | | | |
|---|---|---|---|---|
| 6,155,976 A * | 12/2000 | Sackner | A61H 31/008 | 600/300 |
| 7,654,974 B2 * | 2/2010 | Bass | A61H 1/0218 | 5/624 |
| 2012/0046540 A1 * | 2/2012 | Branch | A61B 5/459 | 600/407 |
| 2012/0298113 A1 * | 11/2012 | Hruska | A61H 1/001 | 128/845 |

* cited by examiner

*Primary Examiner* — Kari K Rodriquez

(57) ABSTRACT

A device for lumbar and knee recovery may include a rotatable chassis that may be mounted on a main chassis. An upper traction assembly and a lower traction assembly may be slidably mounted on the rotatable chassis and may provide two perpendicular translational degrees of freedom and a rotational degree of freedom. A patient may be positioned within the device and a control unit may be utilized for performing lumbar and knee recovery maneuvers by urging a plurality of actuators to activate the two translational degrees of freedom and the one rotational degree of freedom. Such activation of the degrees of freedom of the device may be carried out based at least in part on recovery and traction maneuvers stored on a memory of the device or received via a user interface unit from a user.

19 Claims, 10 Drawing Sheets

LUMBER AND KNEE RECOVERY DEVICE

CROSS-REFERENCE TO RELATED APPLICATION

This application is a continuation-in-part of PCT/IB2022/051262 filed Feb. 12, 2022, which claims the benefit of priority from U.S. Provisional Patent Application Ser. No. 63/216,540, filed on Jun. 30, 2021, and entitled "LUMBAR AND KNEE RECOVERY DEVICE," which are both incorporated herein by reference in their entirety.

TECHNICAL FIELD

The present disclosure relates to recovery devices, particularly to systems and method for applying tension on spine, lumbar, and knee. More particularly, the present disclosure is related to a method and device for lumbar and knee recovery.

BACKGROUND

Recovery may refer to techniques that may be utilized by individuals to reduce fatigue after a hard day at work or after an intense work out. Recovery techniques may further be utilized for enhancing performance. Recovery techniques may include, but are not limited to massage, stretching, compression, and hydrotherapy. Recovery techniques may be beneficial both to individuals with limited activity during the day and individuals performing vigorous and intense physical and mental activities, such as athletes.

Recovery techniques may emphasize on both physical and mental recovery. Some of basic recovery methods, as mentioned in the preceding paragraph may include performing stretches, massaging active tissue, and applying electrical current to muscles, and other similar physiotherapy equipment. Performing stretches may involve pulling out muscles to their full length, which helps relieve muscle tension and ease joint mobility. Massaging active tissues may help make body free of any harmful materials and supply necessary nutrients for tissues.

Various types of recovery equipment have been developed that may be utilized for alleviating pain, reducing fatigue, and resolving post workout and post-match complications that athletes deal with. However, most of these devices are developed for specific areas of body and utilizing them for different parts of body may be both time-consuming and expensive. In addition, some of these devices are size-specific, meaning they are designed for individuals with specific sizes. As a result, a family of several individuals with different sizes may require having several devices. Some of these devices are only developed for people with joint and muscular problems and healthy people cannot utilize them for recovery. For example, lumbar traction tables are only beneficial to individuals with joint or muscle complications.

There is, therefore, a need for a recovery device that may have all the advantages offered by existing recovery devices and further addresses the aforementioned shortcomings of these devices. There is further a need for a device that may allow for placing hips and trunk of an individual in a floating position, while maintaining the most relaxed state for that individual.

SUMMARY

This summary is intended to provide an overview of the subject matter of the present disclosure and is not intended to identify essential elements or key elements of the subject matter, nor is it intended to be used to determine the scope of the claimed implementations. The proper scope of the present disclosure may be ascertained from the claims set forth below in view of the detailed description and the drawings.

According to one or more exemplary embodiments, the present disclosure is directed to a device for lumbar and knee recovery. An exemplary device may include a main chassis, a rotatable chassis that may be pivotally coupled to an exemplary main chassis, and a tilt actuator that may be mounted between an exemplary main chassis and an exemplary rotatable chassis. An exemplary tilt actuator may be configured to drive a rotational motion of an exemplary rotatable chassis relative to an exemplary main chassis about a tilt axis.

An exemplary device for lumbar and knee recovery may further include an upper traction assembly. An exemplary upper traction assembly may include an upper sliding frame that may be slidably mounted on an exemplary rotatable chassis. An exemplary upper sliding frame may be configured to be slidable relative to an exemplary rotatable chassis along a first axis. An exemplary first axis may be perpendicular to an exemplary tilt axis. An exemplary upper traction assembly may further include a first linear actuator that may be coupled between an exemplary rotatable chassis and an exemplary upper sliding frame. An exemplary first linear actuator may be configured to drive a sliding motion of an exemplary upper sliding frame relative to an exemplary rotatable chassis.

An exemplary device for lumbar and knee recovery may further include a lower traction assembly. An exemplary lower traction assembly may include a horizontal sliding frame that may be slidably mounted on an exemplary rotatable chassis. An exemplary horizontal sliding frame may be configured to be slidable relative to an exemplary rotatable chassis along an exemplary first axis. An exemplary lower traction assembly may further include a second linear actuator that may be coupled between an exemplary rotatable chassis and an exemplary horizontal sliding frame. An exemplary second linear actuator may be configured to drive a sliding motion of an exemplary horizontal sliding frame relative to an exemplary rotatable chassis.

An exemplary lower traction assembly may further include a vertical sliding frame that may be slidably mounted on an exemplary horizontal sliding frame. An exemplary vertical sliding frame may be configured to be slidable relative to an exemplary horizontal sliding frame along a second axis. An exemplary second axis may be perpendicular to both an exemplary first axis and an exemplary tilt axis. An exemplary lower traction assembly may further include a third linear actuator that may be coupled between an exemplary horizontal sliding frame and an exemplary vertical sliding frame. An exemplary third linear actuator may be configured to drive a sliding motion of an exemplary vertical sliding frame relative to an exemplary horizontal sliding frame.

An exemplary lower traction assembly may further include a seat that may be rotatably mounted on an exemplary vertical sliding frame, where a plane of an exemplary seat may be parallel with an exemplary second axis and perpendicular to an exemplary first axis. An exemplary seat may be rotatable relative to an exemplary vertical sliding frame about a rotational axis parallel with an exemplary first axis.

An exemplary device for lumbar and knee recovery may further include a control unit that may be connected in signal communication with an exemplary tilt actuator, an exemplary first actuator, an exemplary second actuator, an exemplary third actuator, and an exemplary fourth actuator. An exemplary control unit may include at least on processor and at least one memory that may be coupled to an exemplary processor. An exemplary memory may be configured to store a plurality of lumbar and knee recovery maneuvers in terms of two translational degrees of freedom along an exemplary first axis and an exemplary second axis and one rotational degree of freedom about an exemplary rotational axis.

An exemplary memory may further be configured to store executable instructions to urge an exemplary processor to receive a lumbar and knee recovery maneuver of the plurality of lumbar and knee recovery maneuvers, urge an exemplary upper traction assembly and an exemplary lower traction assembly to perform the received lumbar and knee recovery maneuver.

In an exemplary embodiment, such urging of an exemplary upper traction assembly and an exemplary lower traction assembly may be carried out by at least one of urging an exemplary first actuator and an exemplary second actuator to move an exemplary upper sliding frame and an exemplary horizontal sliding frame relative to each other along an exemplary first axis based at least in part on the received lumbar and knee recovery maneuver, urging an exemplary third actuator to move an exemplary vertical sliding frame relative to an exemplary horizontal sliding frame along an exemplary second axis, and urging an exemplary fourth actuator to rotate an exemplary seat about an exemplary rotational axis relative to an exemplary vertical sliding frame.

An exemplary control unit may further include a user interface unit that may be configured to receive input data from a user. In an exemplary embodiment, exemplary input data may include at least one lumbar and knee recovery maneuver form the plurality of lumbar and knee recovery maneuvers stored on an exemplary memory.

BRIEF DESCRIPTION OF THE DRAWINGS

The novel features which are believed to be characteristic of the present disclosure, as to its structure, organization, use and method of operation, together with further objectives and advantages thereof, will be better understood from the following drawings in which a presently exemplary embodiment of the present disclosure will now be illustrated by way of example. It is expressly understood, however, that the drawings are for illustration and description only and are not intended as a definition of the limits of the present disclosure. Embodiments of the present disclosure will now be described by way of example in association with the accompanying drawings in which.

DETAILED DESCRIPTION

The novel features which are believed to be characteristic of the present disclosure, as o its structure, organization, use and method of operation, together with further objectives and advantages thereof, will be better understood from the following discussion.

Figure 1:
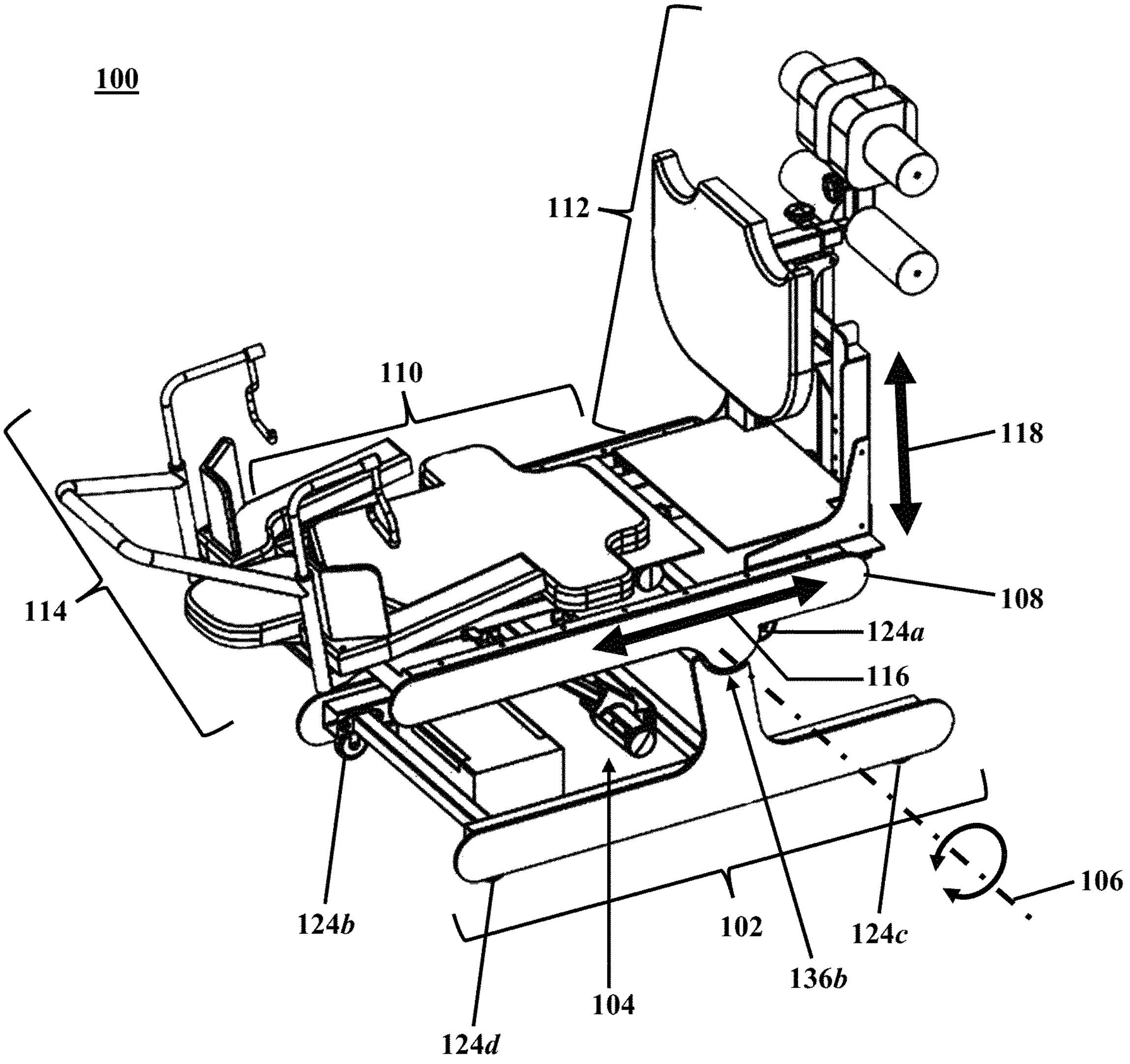
FIG. 1 illustrates a perspective view of a device for lumbar and knee recovery, consistent with one or more exemplary embodiments of the present disclosure.

FIG. 1 illustrates a perspective view of a device 100 for lumbar and knee recovery, consistent with one or more exemplary embodiments of the present disclosure. In an exemplary embodiment, device 100 may be configured to perform different recovery plans that may consist of carrying out various types of tractions on a user's body, that is, by adjusting device 100 to different position, different types of tractions may be applied on a user's body. In an exemplary embodiment, device 100 may include a main chassis 102 and a rotatable chassis 108 that may be moveably mounted on main chassis 102. In an exemplary embodiment, rotatable chassis 108 may be rotated with respect to main chassis 102 about a tilt axis 106 by utilizing a tilt actuator 104 mounted between main chassis 102 and rotatable chassis 108.

Figure 2A:
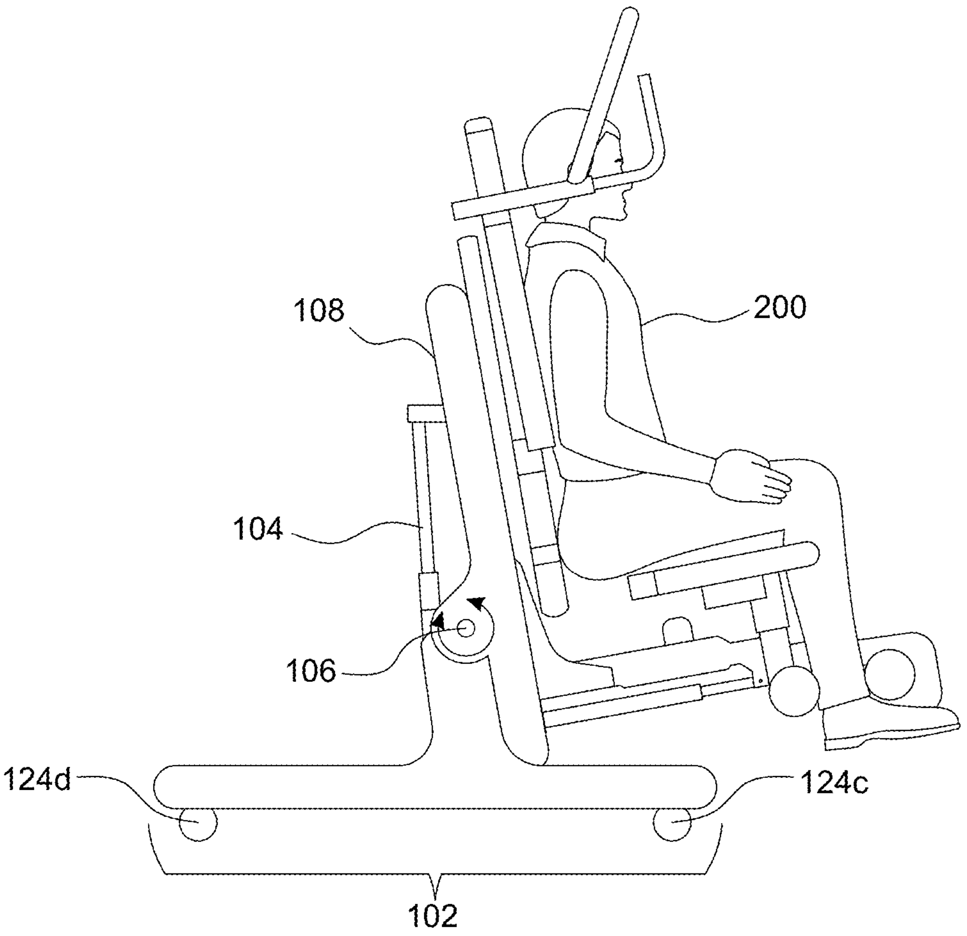
FIG. 2A illustrates a side-view of device for lumbar and knee recovery in a sitting position, consistent with one or more exemplary embodiments of the present disclosure.
Figure 2B:
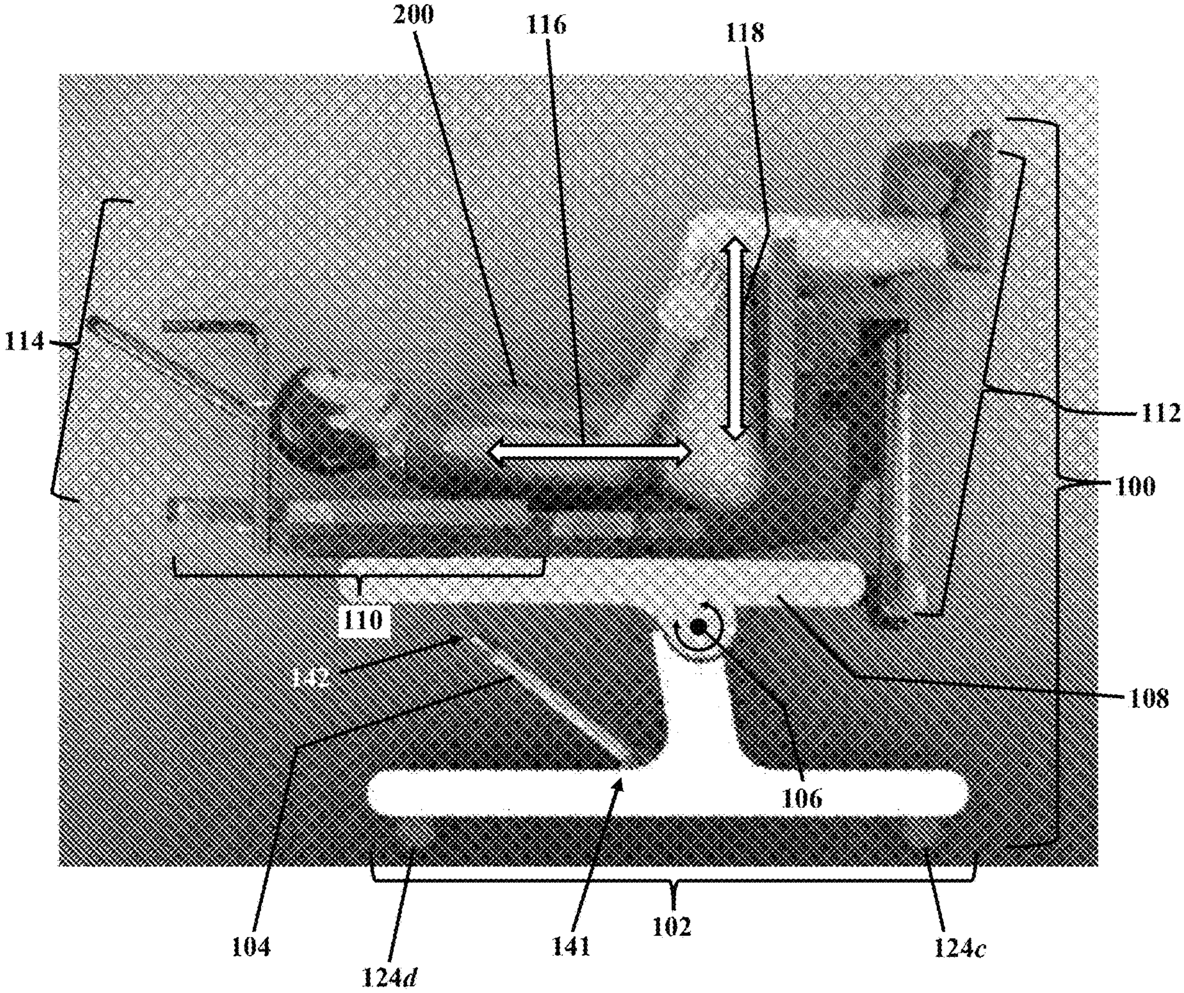
FIG. 2B illustrates a side-view of a device for lumbar and knee recovery in a prone position, consistent with one or more exemplary embodiments of the present disclosure.

FIG. 2A illustrates a side-view of device 100 for lumbar and knee recovery in a sitting position, consistent with one or more exemplary embodiments of the present disclosure. FIG. 2B illustrates a side-view of device 100 for lumbar and knee recovery in a prone position, consistent with one or more exemplary embodiments of the present disclosure. In an exemplary embodiment, a sitting position may refer to a configuration of exemplary device 100, wherein a potential user would be considered sitting when utilizing device 100 in said position. In an exemplary embodiment, a prone position may refer to a configuration of exemplary device 100, wherein a potential user would lie flat with their chest down and their back up, when utilizing device 100 in said position.

In an exemplary embodiment, such rotational movement of rotatable chassis 108 with respect to main chassis 102 may allow for rotating rotatable chassis 108 to a sitting position, as illustrated in FIG. 2A, where a patient 200 may sit comfortably on device 100. In an exemplary embodiment, after the position of patient 200 is adjusted, title actuator 104 may be utilized to urge rotatable chassis 108 to rotate about tilt axis 106 to a prone position, as illustrated in FIG. 2B. Here, patient 200 may be in a prone position and upper body and lower body of patient 200 may be fixed to prepare patient 200 for application of various recovery plans.

In an exemplary embodiment, device 100 may further include a traction table that may be mounted on rotatable chassis 108. In an exemplary embodiment, the traction table may include an upper traction assembly 110 and a lower traction assembly 112 that may be mounted on rotatable chassis 108. In an exemplary embodiment, upper traction assembly 110 and lower traction assembly 112 may be configured to be moveable with respect to each other along a first axis 116. In an exemplary embodiment, upper traction assembly 110 may include a translational degree of freedom along first axis 116. Such translational degree of freedom of upper traction assembly 110 may allow for upper traction assembly to assume a translational motion with respect to rotatable chassis 108 along first axis 116. In an exemplary embodiment, lower traction assembly 112 may include a first translational degree of freedom along first axis 116 and a second translational degree of freedom along a second axis 118. In an exemplary embodiment, second axis 118 may be perpendicular to first axis 116.

In an exemplary embodiment, as mentioned before, when device 100 is tilted to a prone position, before recovery plans may be performed by device 100, upper body of patient 200 must be fixed to device 100. To this end, in an exemplary embodiment, device 100 may further include an upper body fixing assembly 114 that may be configured to fix an upper body of an exemplary user, such as patient 200 with respect to device 100. As used herein, fixing an upper body of a user, such as patient 200 may refer to fixing an upper body of patient 200 such that the upper body of patient 200 may not assume any unwanted translational or rotational motions with respect to upper traction assembly 110. For example, upper body fixing assembly 114 being configured to fix an upper body of patient 200 may refer to upper body fixing assembly 114 being a blet, or cuffs, etc. that may be fastened around an upper body of patient 200 to fix an upper body of patient 200.

Figure 3:
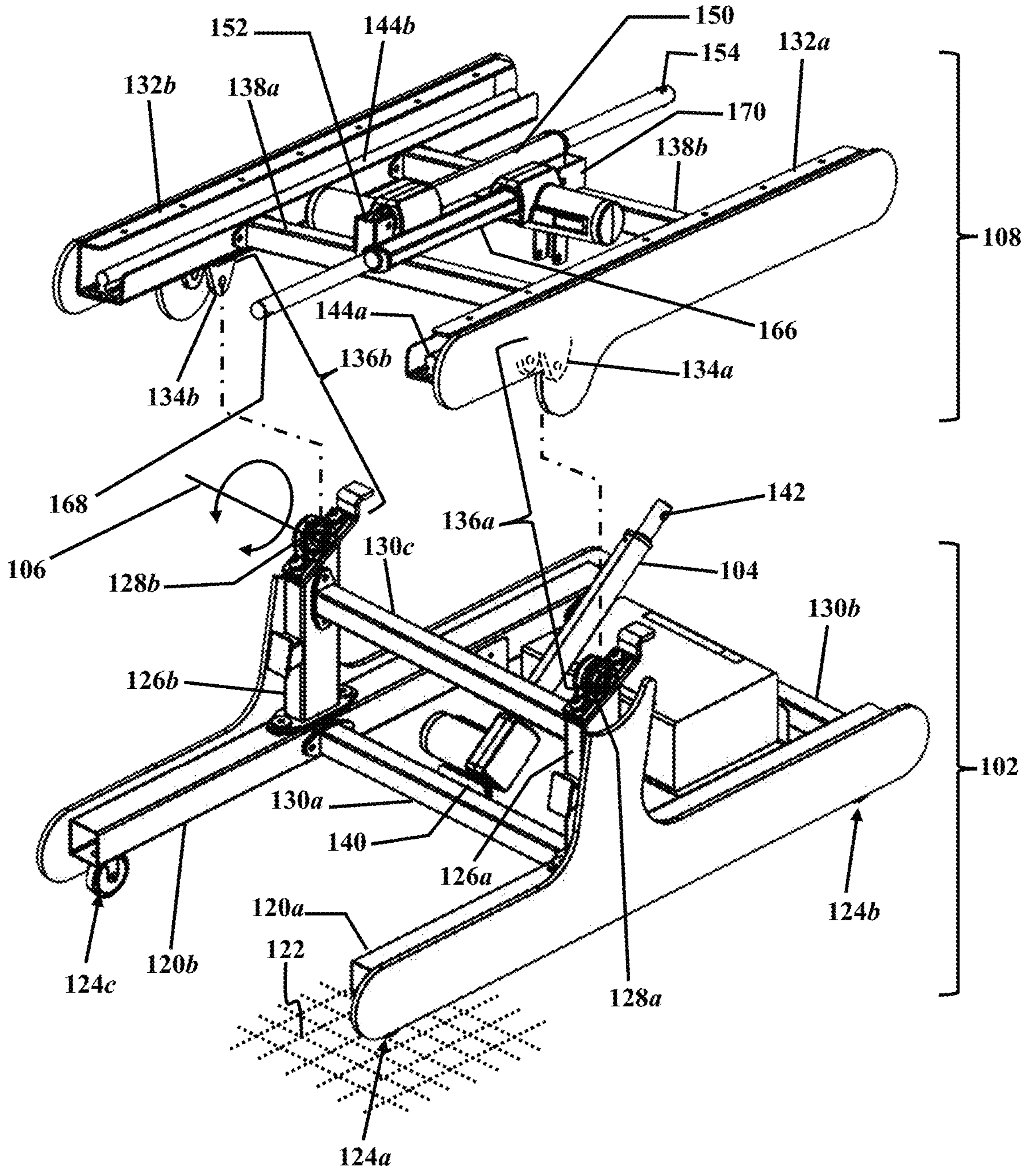
FIG. 3 illustrates an exploded perspective view of a main chassis and a rotatable chassis, consistent with one or more exemplary embodiments of the present disclosure.

FIG. 3 illustrates an exploded perspective view of main chassis 102 and rotatable chassis 108, consistent with one or more exemplary embodiments of the present disclosure. In an exemplary embodiment, main chassis 102 may include a couple of parallel horizontal frame portions (120*a*, 120*b*) that may rest on a support surface 122. In an exemplary embodiment, parallel horizontal frame portions (120*a*, 120*b*) may extend parallel with support surface 122 and may include a plurality of wheels (124*a*-124*d*) attached to parallel horizontal frame portions (120*a*, 120*b*) to allow for main chassis 102 to be moved on and relative to support surface 122. Such configuration of wheels (124*a*-124*d*) under parallel horizontal frame portions (120*a*, 120*b*) may allow for device 100 to be moveable and maneuverable about a room or office. In an exemplary embodiment, main chassis 102 may further include a couple of parallel vertical frame portions (126*a*, 126*b*) that may be attached to or integrally formed with respective parallel horizontal frame portions (120*a*, 120*b*) and may extend substantially vertically from respective horizontal frame portions (120*a*, 120*b*). For example, first vertical frame portion 126*a* may extend vertically from corresponding first horizontal frame portion 120*a* and second vertical frame portion 126*b* may extend vertically from corresponding second horizontal frame portion 120*b*. In other words, first horizontal frame portion 120*a* and second horizontal frame portion 120*b* may extend parallel with each other on opposite lateral sides of main chassis 102, and accordingly, first vertical frame portion 126*a* and second vertical frame portion 126*b* may extend parallel with each other on opposite lateral sides of main chassis 102.

In an exemplary embodiment, device 100 may include a couple of bearings (128*a*, 128*b*) that may be mounted on respective parallel vertical frame portions (126*a*, 126*b*). Specifically, in an exemplary embodiment, a first bearing 128*a* may be mounted on a distal end of first vertical frame portion 126*a* and a second bearing 128*b* may be mounted on a distal end of second vertical portion 126*b*. In other words, first bearing 128*a* and second bearing 128*b* may be mounted on opposite lateral sides of main chassis 102 and may allow? rotational movements about tilt axis 106. As used herein, opposite lateral sides of main chassis 102 may refer to two sides of main chassis 102 that may be spaced apart along tilt axis 106.

In an exemplary embodiment, parallel horizontal frame portions (120*a*, 120*b*) may be interconnected by a plurality of brace beams, such as a first elongated brace 130*a* and a second elongated brace 130*b* that may be attached between parallel horizontal frame portions (120*a*, 120*b*). In an exemplary embodiment, parallel vertical frame portions (126*a*, 126*b*) may be interconnected by at least one brace beam, such as a third elongated brace 130*c*. In an exemplary embodiment, first brace 130*a*, second brace 130*b*, and third brace 130*c* may be parallel with each other and may all be extended along title axis 106.

In an exemplary embodiment, rotatable chassis 108 may include a pair of parallel elongated frames (132*a*, 132*b*) that may extend on opposite lateral sides of rotatable chassis 108 parallel with each other and with parallel horizontal frame portions (120*a*, 120*b*). In an exemplary embodiment, a pair of clevises (134*a*, 134*b*) may be attached on respective pair of parallel elongated frames (132*a*, 132*b*). For example, a first clevis 134*a* may be attached to a first horizontal frame 132*a* and a second clevis 134*b* may be attached to a second horizontal frame 132*b*. In an exemplary embodiment, rotatable chassis 108 may be rotatably coupled to main chassis 102 by utilizing respective clevises (134*a*, 134*b*) and bearings (128*a*, 128*b*). Specifically, first clevis 134*a* may be coupled to first bearing 128*a* by utilizing a pin to form a first revolute joint 136*a* between rotatable chassis 108 and main chassis 102, and second clevis 134*b* may be coupled to second bearing 1286 by utilizing a pin to form a second revolute joint 136*b* between rotatable chassis 108 and main chassis 102. In an exemplary embodiment, first revolute joint 136*a* and second revolute joint 136*b* may be single-axis joints with their axes of rotation parallel and aligned with title axis 106. Such coupling of rotatable chassis 108 and main chassis 102 by utilizing first revolute joint 136*a* and second revolute joint 136*b* may allow for rotatable chassis 108 to be rotatable about title axis 106 relative to main chassis 102.

In an exemplary embodiment, pair of parallel elongated frames (132*a*, 132*b*) may be attached to each other by a plurality of brace beams, such as first elongated beam 138*a* and second elongated beam 138*b* that may be extended along tilt axis 106.

In an exemplary embodiment, tilt actuator 104 may include a double-pivot jack with a proximal end 141 of tilt actuator 104 pivotally coupled to main chassis 102 and an opposing distal end 142 of tilt actuator 104 pivotally coupled to rotatable chassis 108. Specifically, in an exemplary embodiment, proximal end 141 of tilt actuator 104 may be pivotally coupled to first elongated brace 130*a* of main chassis 102 and opposing distal end 142 of tilt actuator 104 may be pivotally coupled to second elongated beam 138*b* of rotatable chassis 108. In an exemplary embodiment, proximal end 141 and distal end 142 of title actuator 104 may be extended away from each other or retracted toward each other and thereby urge rotatable chassis 108 to pivot about tilt axis 106. In other words, extension and retraction motions of tilt actuator 104 may be transformed into rotational movement of rotatable chassis 108 relative to main chassis 102 due to the coupling between rotatable chassis 108 and main chassis provided by first revolute joint 136*a* and second revolute joint 136*b*. In an exemplary embodiment, tilt actuator 104 may include a hydraulic jack or an electric jack that may be extended/retracted by an electric motor. In an exemplary embodiment, proximal end 141 of title actuator 104 may be coupled to first elongated brace 130*a* of main chassis 102 by utilizing a pin joint and distal end 142 of tilt actuator 104 may be coupled to second elongated beam 138*b* of rotatable chassis 108 by utilizing a pin joint. Such double-pivot coupling of title actuator 104 between first elongated brace 130*a* and second elongated beam 138*b* may further allow for transforming the extension/retraction motion of tilt actuator 104 to pivotal motion of rotatable chassis 108 relative to main chassis 102.

Figure 4:
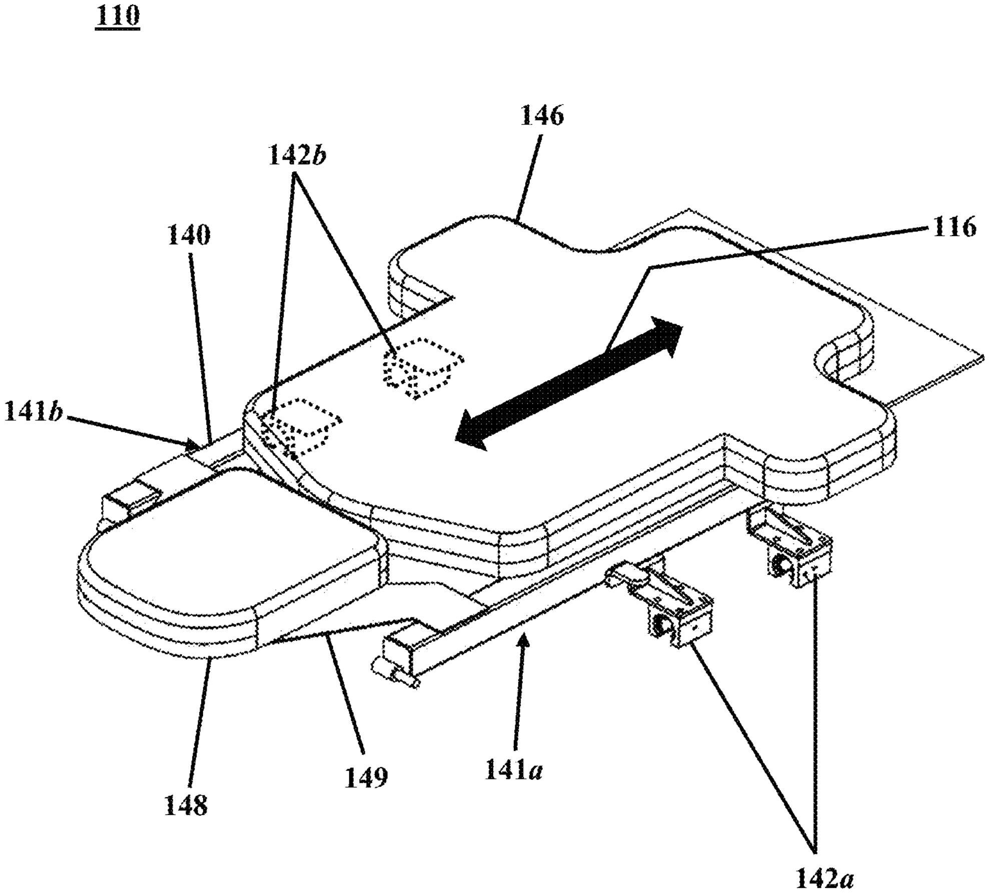
FIG. 4 illustrates a perspective view of an upper traction assembly, consistent with one or more exemplary embodiments of the present disclosure.

FIG. 4 illustrates a perspective view of upper traction assembly 110, consistent with one or more exemplary embodiments of the present disclosure. In an exemplary embodiment, upper traction assembly 110 may include an upper sliding frame 140 that may be made of two parallel beams that may be interconnected by at least one brace beam. In an exemplary embodiment, upper sliding frame 140 may further include a plurality of linear bushings (142*a*. 142*b*) that may be attached to opposing lateral sides of upper sliding frame 140. For example, a first couple of linear bushings 142*a* may be mounted on a first lateral side 141*a* of upper sliding frame 140 and a second couple of linear bushings 142*b* may be mounted on an opposite second lateral side 141*b* of upper sliding frame 140. Referring to FIG. 3, rotatable chassis 108 may further include a first elongated guide pole 144*a* that may be mounted on and extended parallel with first horizontal frame 132*a* and a second elongated guide pole 144*b* that may be mounted on and extended parallel with second horizontal frame 132*b*. In an exemplary embodiment, first couple of linear bushings 142*a* may be slidably coupled to first elongated guide pole 144*a* and second couple of linear bushings 142*b* may be slidably coupled to second elongated guide pole 144*b*. In an exemplary embodiment, such coupling of linear bushings (142*a*. 142*b*) with corresponding elongated guide poles (144*a*, 144*b*) may allow for slidably mounting upper sliding frame 140 on rotatable chassis 108, such that upper traction assembly 110 may be slidable relative to rotatable chassis 108 along first axis 116.

In an exemplary embodiment, upper traction assembly 110 may further include a backrest 146 that may include a cushioned support surface mounted on upper sliding frame 140. In an exemplary embodiment, backrest 146 may support an upper body portion of a patient. In an exemplary embodiment, upper traction assembly 110 may further include a headrest 148 that may include a cushioned support surface mounted on upper sliding frame 140 by utilizing a mounting plate 149. In an exemplary embodiment, headrest 148 may be configured to support the head of a patient.

As mentioned before, upper traction assembly 110 may be slidable relative to rotatable chassis 108 along first axis 116. In an exemplary embodiment, device 100 may further include a first linear actuator 150, such as an electric jack operated by an electric motor, that may be coupled between rotatable chassis 108 and upper sliding frame 140. Specifically, a proximal end 152 of first linear actuator 150 may be pivotally attached to second elongated beam 138*b* of rotatable chassis 108 and a distal end 154 of first linear actuator 150 may be pivotally attached to upper sliding frame 140. Such coupling of first linear actuator 150 between rotatable chassis 108 and upper sliding frame 140 may allow for urging upper sliding frame 140 to slide along first axis 116 on guide poles (144*a*, 144*b*) by extending/retracting first linear actuator 150.

Figure 5A:
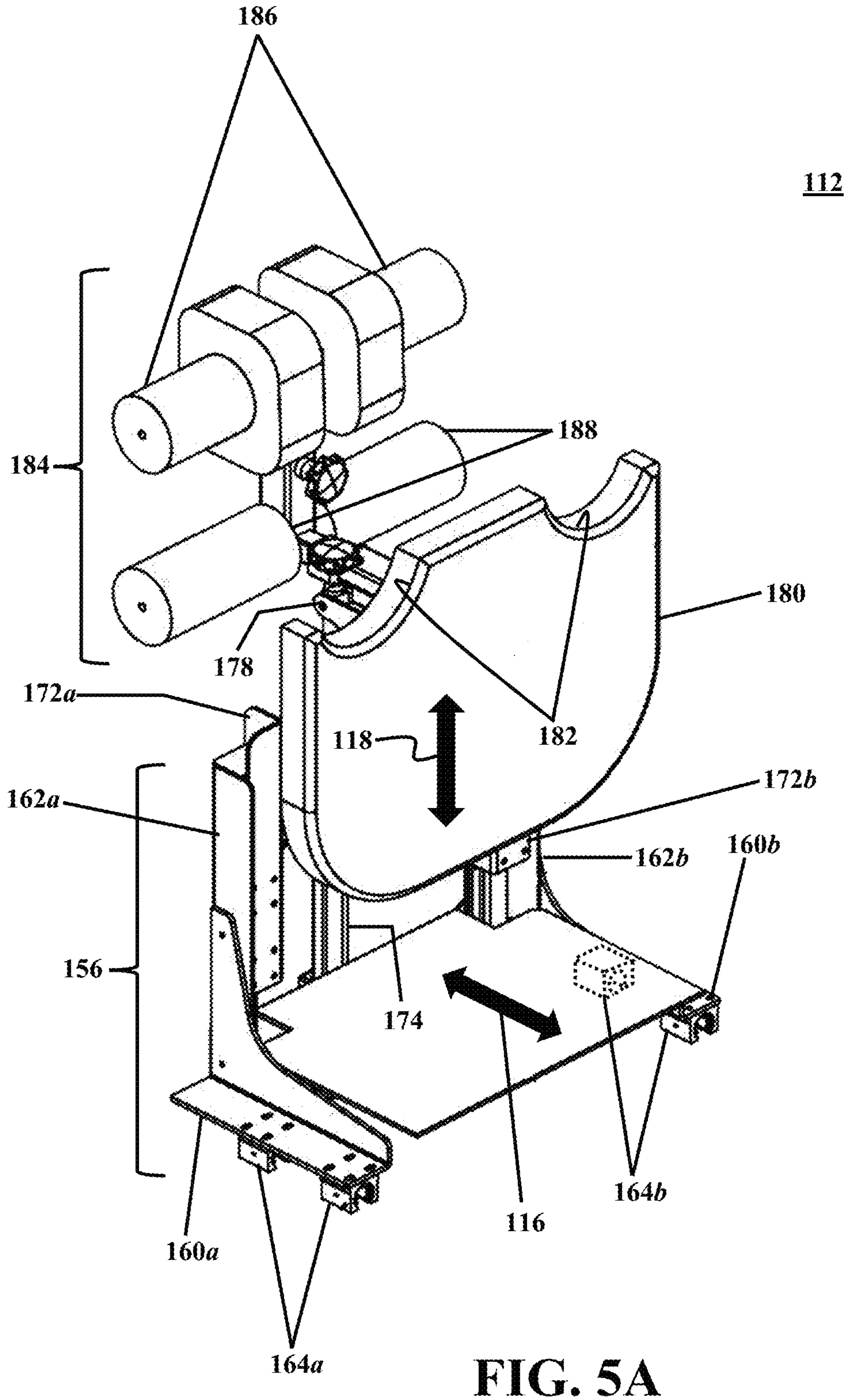
FIG. 5A illustrates a front perspective view of a lower traction assembly, consistent with one or more exemplary embodiments of the present disclosure.
Figure 5B:
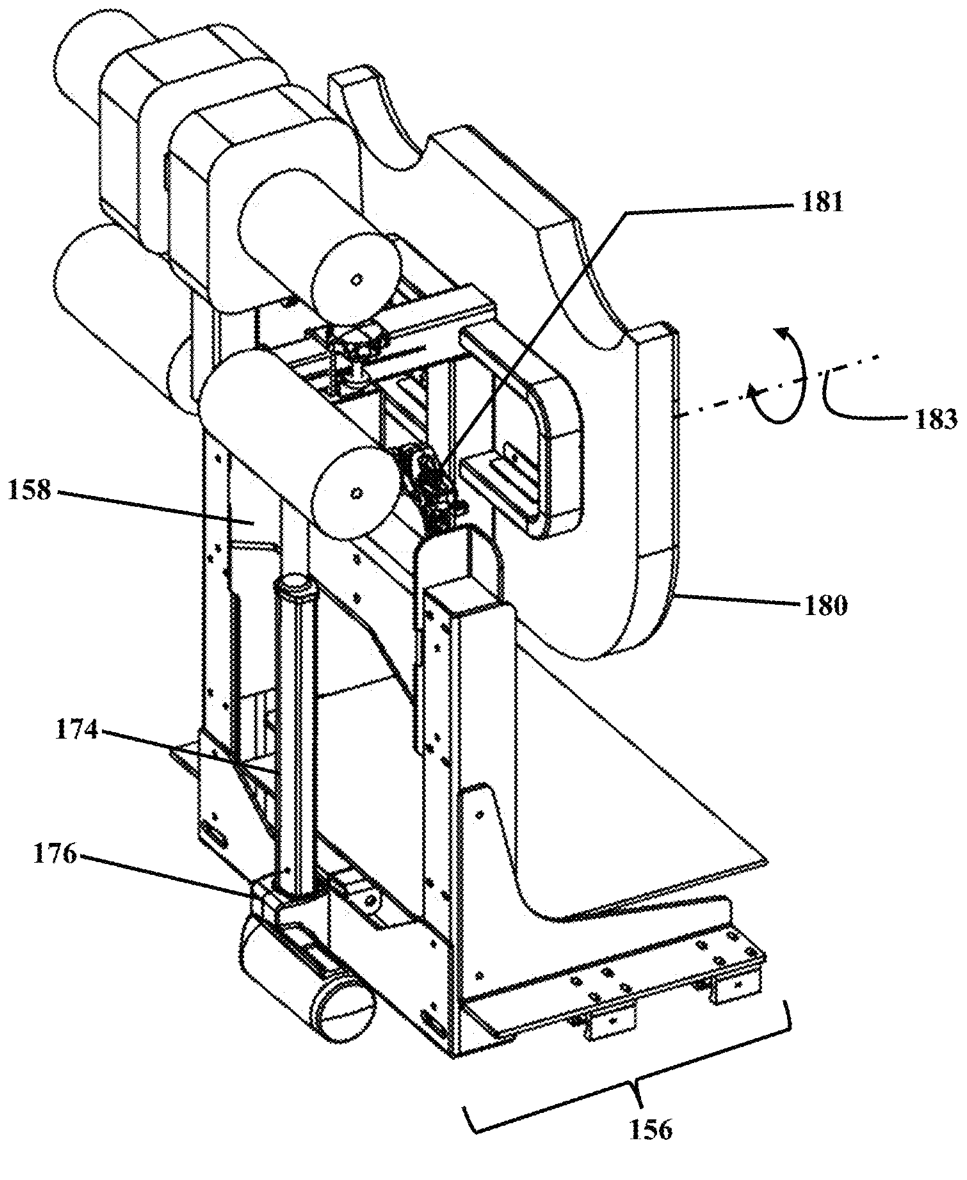
FIG. 5B illustrates a rear perspective view of a lower traction assembly, consistent with one or more exemplary embodiments of the present disclosure.

FIG. 5A illustrates a front perspective view of lower traction assembly 112, consistent with one or more exemplary embodiments of the present disclosure. FIG. 5B illustrates a rear perspective view of lower traction assembly 112, consistent with one or more exemplary embodiments of the present disclosure. In an exemplary embodiment, lower traction assembly 112 may include a horizontal sliding frame 156 that may be slidably mounted on rotatable chassis 108 and a vertical sliding frame 158 that may be slidable mounted on horizontal sliding frame 156. In an exemplary embodiment, lower traction assembly 112 may include two degrees of freedom, one translational degree of freedom along first axis 116 and a second translational degree of freedom along second axis 118.

In an exemplary embodiment, horizontal sliding frame 156 may include a first couple of parallel elongated links (160*a*, 160*b*) that may horizontally extend along first axis 116 parallel with each other on lateral sides of horizontal sliding frame 156. In an exemplary embodiment, first couple of parallel elongated links (160*a*, 160*b*) may be spaced apart from each other along tilt axis 106, which is perpendicular to first axis 116. In an exemplary embodiment, horizontal sliding frame 156 may further include a second couple of parallel elongated links (162*a*, 162*b*) that may be attached to or integrally formed with respective first couple of parallel elongated links (160*a*, 160*b*). For example, link 160*a* of first couple of parallel elongated links (160*a*, 160*b*) may be attached to or integrally formed with respective link 162*a* of second couple of parallel elongated links (162*a*, 162*b*). In an exemplary embodiment, link 160*a* may be perpendicular to link 162*a*. Similarly, link 160*b* of first couple of parallel elongated links (160*a*, 160*b*) may be attached to or integrally formed with respective link 162*b* of second couple of parallel elongated links (162*a*, 162*b*). In an exemplary embodiment, link 160*b* may be perpendicular to link 162*b*.

In an exemplary embodiment, a first couple of linear bushings 164*a* may be attached to link 160*a* of first couple of parallel elongated links (160*a*, 160*b*) and a second couple of linear bushings 164*b* may be attached to link 160*b* of first couple of parallel elongated links (160*a*, 160*b*). In an exemplary embodiment, first couple of linear bushings 164*a* may be slidably mounted on first elongated guide pole 144*a* and second couple of linear bushings 164*b* may be slidably mounted on second elongated guide pole 144*b*.

In an exemplary embodiment, to drive a sliding movement of horizontal sliding frame 156 relative to rotatable chassis 108, device 100 may further include a second linear actuator 166, such as an electric jack operated by an electric motor, that may be coupled between rotatable chassis 108 and horizontal sliding frame 156. Specifically, a proximal end 168 of second linear actuator 166 may be pivotally attached to first elongated beam 138*a* of rotatable chassis 108 and a distal end 170 of second linear actuator 166 may be pivotally attached to horizontal sliding frame 156. Such coupling of second linear actuator 166 between rotatable chassis 108 and horizontal sliding frame 156 may allow for urging horizontal sliding frame 156 to slide along first axis 116 on guide poles (144*a*, 144*b*) by extending/retracting second linear actuator 166.

In an exemplary embodiment, vertical sliding frame 158 may include two lateral frame sections (172*a*, 172*b*) that may extend parallel with each other perpendicular to respective second couple of parallel elongated links (162*a*, 162*b*). In an exemplary embodiment, lateral frame sections (172*a*, 172*b*) may be slidably coupled to respective second couple of parallel elongated links (162*a*, 162*b*), such that lateral frame sections (172*a*, 172*b*) may assume linear translational motions along second axis 118 relative to respective second couple of parallel elongated links (162*a*, 162*b*).

For simplicity, sliding components mounted on lateral frame sections (172*a*, 172*b*) and respective second couple of parallel elongated links (162*a*, 162*b*) are not labeled or illustrated in FIGS. 5A and 5B. Here, similar to what was described for sliding mechanism of horizontal sliding frame 156, a plurality of linear bushings may be attached to lateral frame sections (172*a*, 172*b*) and corresponding guide poles may be mounted on second couple of parallel elongated links (162*a*, 162*b*), where linear bushings may be slidable mounted on corresponding guide poles, thereby facilitating sliding motion of vertical sliding frame 158 relative to horizontal sliding frame 156.

In an exemplary embodiment, device 100 may further include a third linear actuator 174, such as an electric jack, that may be mounted between vertical sliding frame 158 and horizontal sliding frame 156. In an exemplary embodiment, third linear actuator 174 may be configured to actuate sliding motion of vertical sliding frame 158 relative to horizontal sliding frame 156. To this end, a proximal end 176 of third linear actuator 174 may be attached to horizontal sliding frame 156 and a distal end 178 of third linear actuator 174 may be attached to vertical sliding frame 158. In an exemplary embodiment, vertical sliding frame 158 may translate along second axis 118 relative to horizontal sliding frame 156 by extending/retracting third linear actuator 174.

In an exemplary embodiment, lower traction assembly 112 may further include a cushioned seat 180 that may be mounted on vertical sliding frame 158 and may be configured to support a hip of a patient. In an exemplary embodiment, cushioned seat 180 may be mounted on and moveable with vertical sliding frame 158. In an exemplary embodiment, the position of cushioned seat 180 may be adjusted along first axis 116 and second axis 118 by utilizing the two translational degrees of freedom of lower traction assembly 112. In an exemplary embodiment, cushioned seat 180 may include two curved recessed portions 182 that may be configured to be positioned behind knees of a user responsive to the user sitting on cushioned seat 180. In an exemplary embodiment, such configuration of cushioned seat 180 may allow for upper portions of legs to be supported on cushioned seat 180 and knees may bend over curved recessed portions 182, while lower portion of legs, such as shins, or calves may be supported within a lower leg fixing mechanism 184. In an exemplary embodiment, lower leg fixing mechanism 184 may include a couple of upper padded support members 186 and a coupled of lower padded support members 188. In an exemplary embodiment, upper padded support members 186 and lower padded support members 188 may be spaced apart along second axis 118 to allow for shins or calves of a patient to pass in between upper padded support members 186 and lower padded support members 188 and then the distance between upper padded support members 186 and lower padded support members 188 may be adjusted such that shins or calves of a patient may be fixed between upper padded support members 186 and lower padded support members 188. In an exemplary embodiment, upper padded support members 186 and lower padded support members 188 may be slidable relative to each other to allow for adjustment of the vertical distance between upper padded support members 186 and lower padded support members 188.

In an exemplary embodiment, cushioned seat 180 may be rotatably mounted on vertical sliding frame 158 by utilizing a revolute joint 181. Such rotatable coupling of cushioned seat 180 on vertical sliding frame 158 may allow for rotating cushioned seat 180 about a rotational axis 183 relative to vertical sliding frame 158. Such rotational degree of freedom about rotational axis 183 may allow for rotating the spine to right and left about rotational axis 183.

In exemplary embodiments, such configuration of cushioned seat 180 and vertical sliding frame 158 may provide many beneficial functional and structural capabilities. For example, lower traction assembly 112 arrangement may allow for fixing the lower-body from rear sides of knees and femur by utilizing cushioned seat 180. In an exemplary embodiment, horizontal degree of freedom of lower traction assembly 112 along first axis 116 and vertical degree of freedom of lower traction assembly 112 along second axis 118 may allow for device 100 to be able to perform different tractions and recovery methods for lumbar and knee. For example, by utilizing the horizontal degree of freedom of device 100 along first axis 116 may allow for pressing and releasing sciatic nerve and *piriformis* muscle.

Figure 6A:
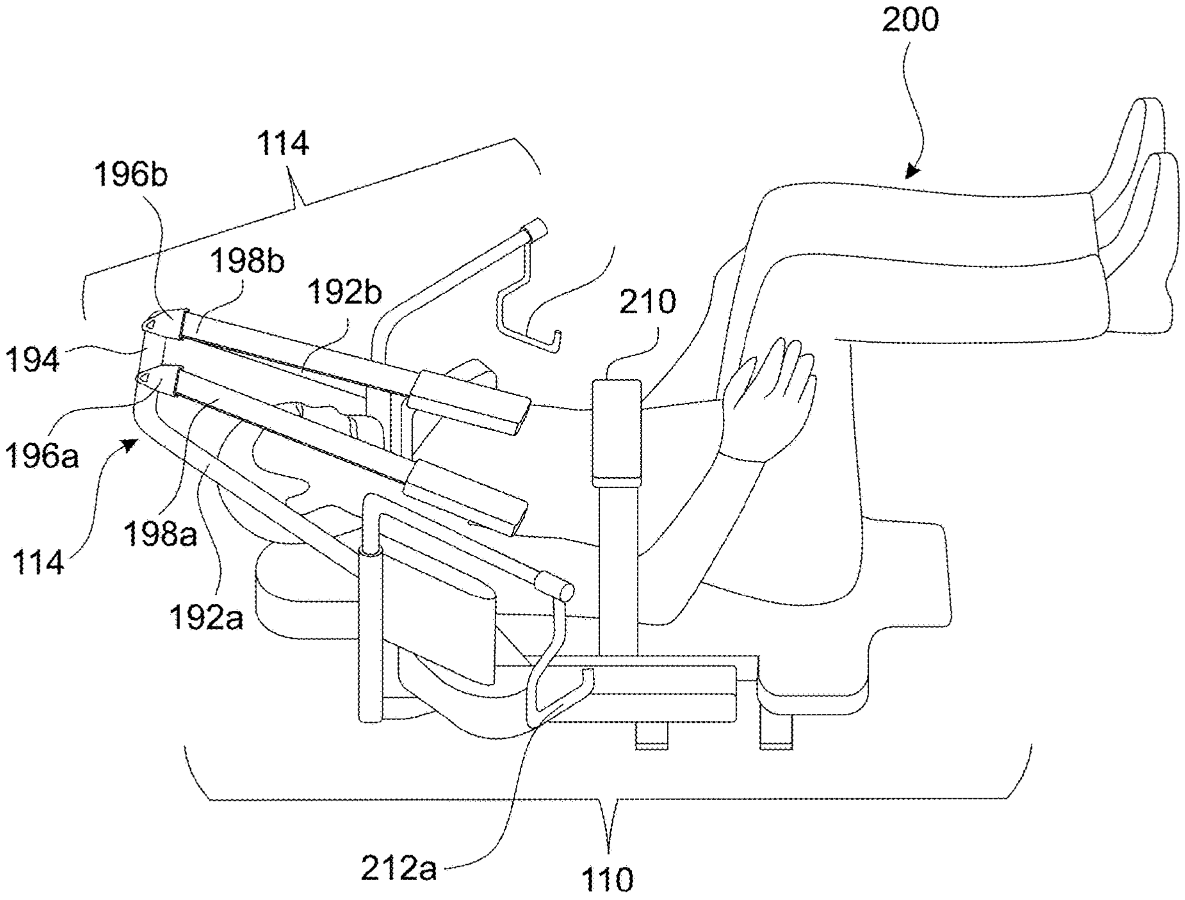
FIG. 6A illustrates a perspective view of an upper traction assembly and an upper body fixing assembly, consistent with one or more exemplary embodiments of the present disclosure.
Figure 6B:
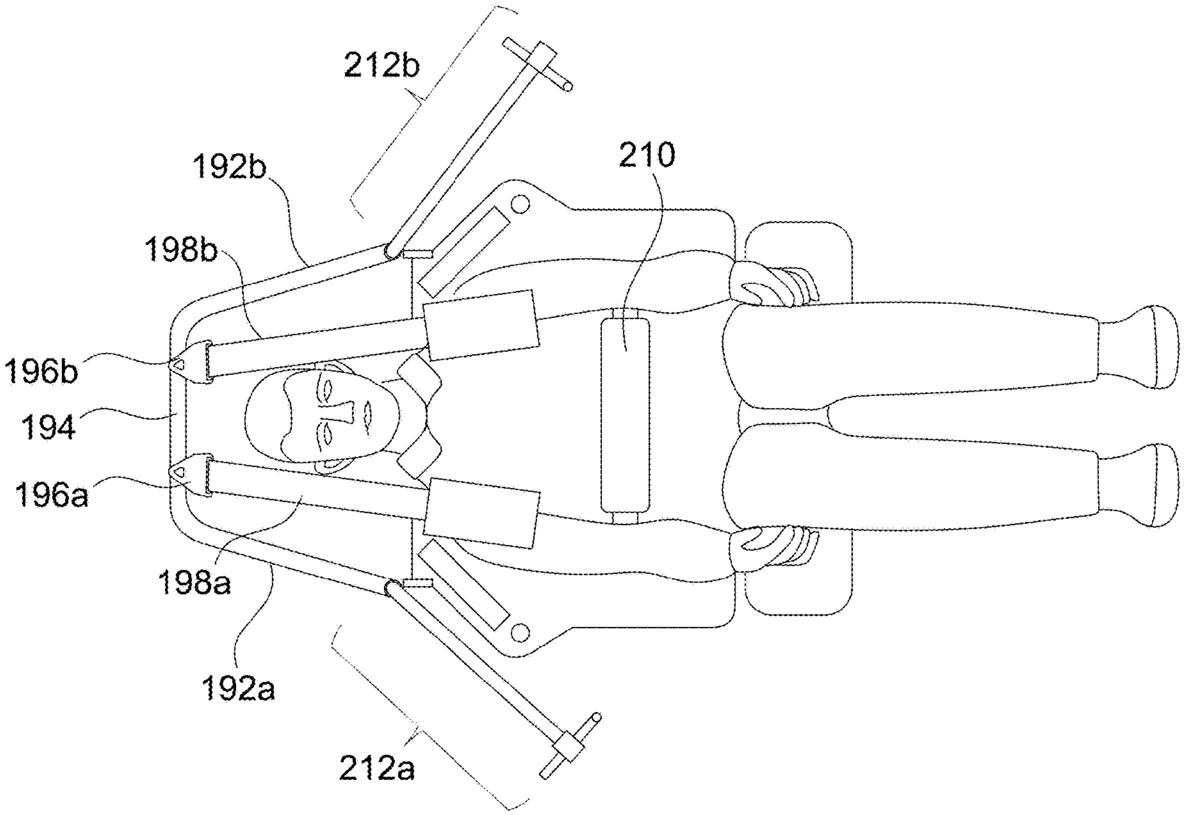
FIG. 6B illustrates a top view of an upper traction assembly and an upper body fixing assembly, consistent with one or more exemplary embodiments of the present disclosure.

FIG. 6A illustrates a perspective view of upper traction assembly 110 and upper body fixing assembly 114, consistent with one or more exemplary embodiments of the present disclosure. FIG. 6B illustrates a top view of upper traction assembly 110 and upper body fixing assembly 114, consistent with one or more exemplary embodiments of the present disclosure. In an exemplary embodiment, upper body fixing assembly 114 may include a fixing frame 190 attached to and moveable with upper traction assembly 110.

In an exemplary embodiment, fixing frame 190 may include two parallel beams (192*a*, 192*b*) attached to opposing lateral sides of upper traction assembly 110, such that in response to patient 200 positioned within device 100, two parallel beams (192*a*, 192*b*) may extend at opposing sides of the body of patient 200. In an exemplary embodiment, upper body fixing assembly 114 may further include a cross beam 194 that may be attached to or integrally formed with distal ends of two parallel beams (192*a*, 192*b*). In an exemplary embodiment, cross beam 194 may include two attach pints (196*a*, 196*b*) that may be configured to receive two belts (198*a*, 198*b*) with adjustable lengths. In an exemplary embodiment, first ends of belts (198*a*, 198*b*) may be fastened to respective attach point (196*a*, 196*b*) on cross beam 194, belts (198*a*, 198*b*) may extend over shoulders of patient 200 going around respective armpits of patient 200 and then opposing second ends of belts (198*a*, 198*b*) may be fastened to respective attachment points on upper traction assembly 110. This way, shoulders and arms of patient 200 may be fixed relative to upper traction assembly 110. As used herein, shoulders and arms of patient 200 being fixed relative to upper traction assembly 110 may refer to shoulders and arms of patient 200 fixed by belts (198*a*, 198*b*) to prevent any unwanted translational or rotational movements of shoulders and arms of patient 200 relative to upper traction assembly 110.

In an exemplary embodiment, upper body fixing assembly 114 may further include a cross belt 210, where extreme ends of cross belt 210 may be attached on opposing lateral sides of upper traction assembly 110. In an exemplary embodiment, responsive to patient 200 being positioned within device 100, cross belt 210 may be fastened over the chest of patient 200 to further fix the upper body of patient 200 relative to upper traction assembly 110. In exemplary embodiments, fastening belts (198*a*, 198*b*) and cross belt 210 may allow for fixing the upper body of patient 200 to upper traction assembly 110. This may allow for performing recovery maneuvers without the upper body of patient 200 assuming any unwanted translational or rotational movements relative to upper traction assembly 110.

In an exemplary embodiment, upper body fixing assembly 114 may further include a pair of hand rests (212*a*, 212*b*) that may be positioned on both sides of upper traction assembly 110 to allow patient 200 to rest their hands on pair of hand rests (212*a*, 212*b*). For example, hand rests (212*a*, 212*b*) may include a pair of belt loops, or a pair of grab handles, etc., that a potential user such as patient 200 may grab onto or rest their wrists on. This may further help the comfort of patient 200.

Figure 7:
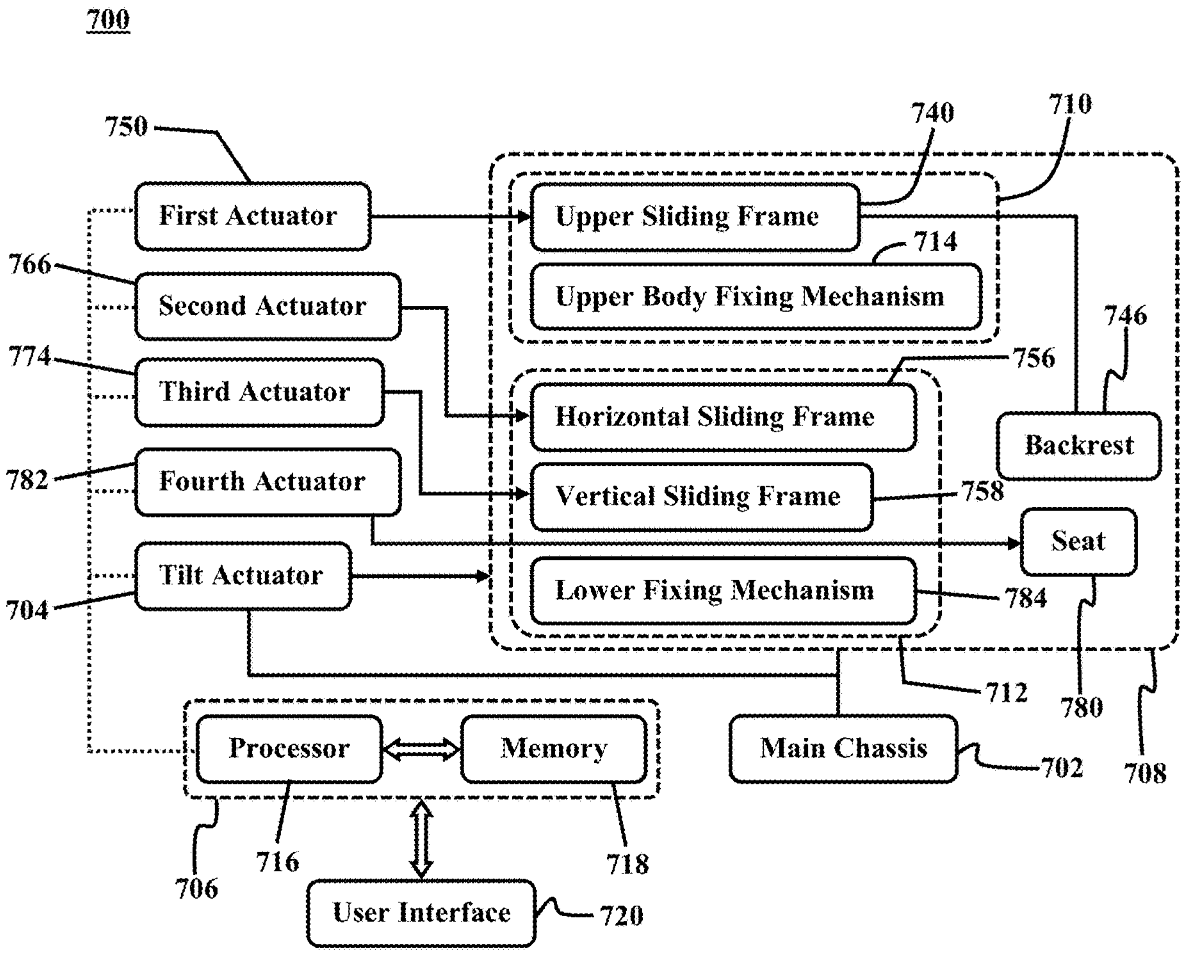
FIG. 7 illustrates a functional block diagram of a system for lumbar and knee recovery, consistent with one or more exemplary embodiments of the present disclosure.

FIG. 7 illustrates a functional block diagram of a system 700 for lumbar and knee recovery, consistent with one or more exemplary embodiments of the present disclosure. In an exemplary embodiment, system 700 may be utilized to perform different recovery plans that may consist of carrying out various types of tractions on a user's body by repositioning elements of system 700 in various configurations. In an exemplary embodiment, system 700 may be similar to device 100. In an exemplary embodiment, system 700 may include a main chassis 702 similar to main chassis 102 and a rotatable chassis 708 similar to rotatable chassis 108 that may be pivotally mounted on main chassis 702. In an exemplary embodiment, rotatable chassis 708 may be rotated with respect to main chassis 702 about a tilt axis by utilizing a tilt actuator 704 similar to tilt actuator 104 mounted between main chassis 702 and rotatable chassis 708. In other words, tilt actuator 704 may be configured to drive a rotational movement of rotatable chassis 708 relative to main chassis 702. As mentioned before, such rotational degree of freedom about a tilt axis similar to tilt axis 106 may allow for configuring system 700 in a sitting position or a prone position.

An exemplary sitting position of system 700 may be similar to a sitting position of device 100 illustrated in FIG. 2A. An exemplary sitting position of system 700 may be utilized when a patient such as patient 200 is to be positioned within system 700. Here, a patient may sit comfortably on a seat 780 of system 700 that may be similar to cushioned seat 180 of device 100. In practice, before asking a patient to sit on seat 780 of device 700, a user must ensure that the patient's bladder is empty and that the patient is wearing a comfortable gown. A user must check for mental status, blood pressure, blood sugar, height, age, weight, possible amputations or disabilities, possible acute diseases, and possible chronic diseases of the patient.

In an exemplary embodiment, system 700 may further include an upper traction assembly 710 similar to upper traction assembly 110 and a lower traction assembly 712 similar to lower traction assembly 112. In an exemplary embodiment, an upper traction assembly 710 and lower traction assembly 712 may be slidably mounted on rotatable chassis 708. In an exemplary embodiment, upper traction assembly 710 may include an upper sliding frame 740 similar to upper sliding frame 140 that may be slidably mounted on rotatable chassis 708, where upper sliding frame 740 may be configured to be slidable relative to rotatable chassis 708 along a first axis similar to first axis 116. In an exemplary embodiment, upper sliding frame 740 being slidable along a first axis may provide upper traction assembly with a first translational degree of freedom that may be utilized to adjust the position of upper sliding frame 740 on rotatable chassis 708. Such first translational degree of freedom may for example be utilized in a sitting position of system 700 to adjust the height of a backrest 746 of system 700 based at least in part on the size of a patient. In an exemplary embodiment, backrest 746 may be structurally similar to backrest 146 and may be mounted on upper sliding frame 740 and may be slidable with upper sliding frame 740. In an exemplary embodiment, backrest 746 may be configured to provide a comfortable cushioned surface for an upper body portion of a patient to rest upon. In an exemplary embodiment, upper traction assembly 710 may further include a first linear actuator 750 similar to first linear actuator 150 that may be coupled between rotatable chassis 708 and upper sliding frame 740, where first linear actuator 750 may be configured to drive a sliding motion of upper sliding frame 740 relative to rotatable chassis 708.

In an exemplary embodiment, lower traction assembly 712 may include a horizontal sliding frame 756 similar to horizontal sliding frame 156 that may slidably mounted on rotatable chassis 708. In an exemplary embodiment, horizontal sliding frame 756 may be configured to be slidable relative to rotatable chassis 708 along a first axis similar to first axis 116. In an exemplary embodiment, lower traction assembly 712 may further include a second linear actuator 766 similar to second linear actuator 166 that may be coupled between rotatable chassis 708 and horizontal sliding frame 756, where second linear actuator 766 may be configured to drive a sliding motion of horizontal sliding frame 756 relative to rotatable chassis 708. In an exemplary embodiment, upper sliding frame 740 and horizontal sliding frame 756 may be configured to be slidable relative to rotatable chassis 708 towards or away from each other along the first axis. In an exemplary embodiment, seat 780 may be attached to and moveable with horizontal sliding frame 756, consequently, such sliding motion of horizontal sliding frame 756 may allow for adjusting the position of seat 780 relative to rotatable chassis 708. For example, seat 180 of service 100 may slide along with horizontal sliding frame 156 along first axis 116.

In an exemplary embodiment, lower traction assembly 712 may further include a vertical sliding frame 758 similar to vertical sliding frame 158 that may be slidably mounted on horizontal sliding frame 756, where vertical sliding frame 758 may be configured to be slidable relative to horizontal sliding frame 756 along a second axis similar to second axis 118. Such sliding motion of vertical sliding frame 758 relative to horizontal sliding frame 756 along a second axis similar to second axis 118 may provide system 700 with a second translational degree of freedom that may be utilized for performing traction maneuvers on a patient. In an exemplary embodiment, to activate such second translational degree of freedom, lower traction assembly 712 may further include a third linear actuator 774 similar to third linear actuator 174 that may be coupled between horizontal sliding frame 756 and vertical sliding frame 758, where third linear actuator 774 may be configured to drive a sliding motion of vertical sliding frame 758 relative to horizontal sliding frame 756. In an exemplary embodiment, seat 780 may be mounted on vertical sliding frame 758, consequently, the position of seat 780 may be adjusted relative to horizontal sliding frame 756 along the second axis. For example, vertical position of cushioned seat 180 may be adjusted relative to horizontal sliding frame 156 along second axis 118.

In an exemplary embodiment, lower traction assembly 712 may further include a fourth actuator 782 that may be coupled to seat 780, where fourth actuator 782 may be configured to drive a rotational movement of seat 780 relative to lower traction assembly 712 about a rotational axis similar to rotational axis 183. Specifically, seat 780 may be rotatably coupled to vertical sliding frame 758 and fourth actuator 782 may be configured to drive a rotational movement of seat 780 relative to vertical sliding frame 758. In other words, seat 780 may include three degrees of freedom, namely a first translational degree of freedom along a horizontal axis similar to first axis 116, a second translational degree of freedom along a vertical axis similar to second axis 118, and a rotational degree of freedom about a rotational axis similar to rotational axis 183.

In practice, an exemplary patient may be positioned within system 700 by actuating rotatable chassis 708 into a sitting position by utilizing tilt actuator 704, asking a patient to sit on seat 780, and then actuating rotatable chassis 708 into a prone position by utilizing tilt actuator 704. In an exemplary embodiment, the speed at which such rotational movement of rotatable chassis 708 may be rotated between sitting position and prone position may be carefully adjusted such that a patient may not suffer from dizziness due to rapid transition from a sitting position to a prone position and vice versa. After, rotatable chassis 708 is rotated into a prone position, upper and lower body of a patient must be fixed to system 700. To this end, in an exemplary embodiment, system 700 may include an upper body fixing mechanism 714 similar to upper body fixing mechanism 114 that may be configured to fix an upper body of a patient to upper traction assembly. In an exemplary embodiment, system 700 may further include a lower body fixing mechanism 784 similar to lower leg fixing mechanism 184 that may be utilized for fixing legs of a patient relative to lower traction assembly 712. When a patient is positioned comfortably on backrest 746 and seat 780 as described above, lumbar and knee recovery maneuvers may be performed on them by utilizing system 700 as will be discussed in the following paragraphs.

In an exemplary embodiment, system 700 may further include a control unit 706 that may be connected in signal communication with tilt actuator 704, first actuator 750, second actuator 766, third actuator 774, and fourth actuator 784. In an exemplary embodiment, control unit 706 may include at least on processor 716 and at least one memory 718 that may be coupled to processor 716. In an exemplary embodiment, memory 718 may be configured to store a plurality of lumbar and knee recovery maneuvers in terms of two translational degrees of freedom along a first axis similar to first axis 116 and a second axis similar to second axis 118 and one rotational degree of freedom about a rotational axis similar to rotational axis 183. In an exemplary embodiment, memory 718 may further be configured to store executable instructions to urge processor 716 to receive a lumbar and knee recovery maneuver of the plurality of lumbar and knee recovery maneuvers, urge upper traction assembly 710 and lower traction assembly 712 to perform the received lumbar and knee recovery maneuver. In an exemplary embodiment, such urging of upper traction assembly 710 and lower traction assembly 712 may be carried out by at least one of urging first actuator 750 and second actuator 766 to move upper sliding frame 740 and horizontal sliding frame 756 relative to each other along the first axis based at least in part on the received lumbar and knee recovery maneuver, urging third actuator 774 to move vertical sliding frame 758 relative to horizontal sliding frame 756 along the second axis, and urging fourth actuator 782 to rotate seat 780 about the rotational axis relative to vertical sliding frame 758.

In an exemplary embodiment, control unit 706 may further include a user interface unit 720 that may be configured to receive input data from a user. In an exemplary embodiment, the input data may include at least one lumbar and knee recovery maneuver form the plurality of lumbar and knee recovery maneuvers stored on memory 718.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

Throughout this specification and the claims which follow, unless the context requires otherwise, the word “comprise”, and variations such as “comprises” or “comprising”, will be understood to imply the inclusion of a stated integer or step or group of integers or steps but not to the exclusion of any other integer or step or group of integers or steps.

Moreover, the word “substantially” when used with an adjective or adverb is intended to enhance the scope of the particular characteristic, e.g., substantially planar is intended to mean planar, nearly planar and/or exhibiting characteristics associated with a planar element. Further use of relative terms such as “vertical”, “horizontal”, “up”, “down”, and “side-to-side” are used in a relative sense to the normal orientation of the apparatus.

What is claimed is:

1. A device for lumbar and knee recovery, the device comprising:

a main chassis;

a rotatable chassis pivotally coupled to the main chassis;

a tilt actuator mounted between the main chassis and the rotatable chassis, the tilt actuator configured to drive a rotational motion of the rotatable chassis relative to the main chassis about a tilt axis;

an upper traction assembly comprising:

an upper sliding frame slidably mounted on the rotatable chassis, the upper sliding frame slidable relative to the rotatable chassis along a first axis, the first axis perpendicular to the tilt axis;

a first linear actuator coupled between the rotatable chassis and the upper sliding frame, the first linear actuator configured to drive a sliding motion of the upper sliding frame relative to the rotatable chassis;

a lower traction assembly comprising:

a horizontal sliding frame slidably mounted on the rotatable chassis, the horizontal sliding frame configured to be slidable relative to the rotatable chassis along the first axis;

a second linear actuator coupled between the rotatable chassis and the horizontal sliding frame, the second linear actuator configured to drive a sliding motion of the horizontal sliding frame relative to the rotatable chassis;

a vertical sliding frame slidably mounted on the horizontal sliding frame, the vertical sliding frame configured to be slidable relative to the horizontal sliding frame along a second axis, the second axis perpendicular to both the first axis and the tilt axis;

a third linear actuator coupled between the horizontal sliding frame and the vertical sliding frame, the third linear actuator configured to drive a sliding motion of the vertical sliding frame relative to the horizontal sliding frame; and a seat rotatably mounted on the vertical sliding frame, a plane of the seat parallel with the second axis and perpendicular to the first axis, the seat rotatable relative to the vertical sliding frame about a rotational axis parallel with the first axis; and an upper body fixing mechanism mounted on the rotatable chassis, the upper body fixing mechanism comprising:

a support bridge mounted across the upper sliding frame, the support bridge comprising two legs attached to and extended from the lateral sides of the upper sliding frame and a cross beam attached across distal ends of the two legs;

a pair of attachment points on the cross beam;

a pair of corresponding attach points on the lateral sides of the upper sliding frame; and a pair of belts mounted between the pair of attachment points on the cross beam and the pair of corresponding attach points on the upper sliding frame, the pair of belts configured to extend over respective shoulders going around respective armpits of a patient responsive to a patient positioned over the upper sliding frame.

2. The device of claim 1, further comprising a pair of pin joints configured to rotatably couple the main chassis and the rotatable chassis, the pair of pin joints mounted on lateral sides of the main chassis coupled to corresponding lateral sides of the rotatable chassis, the pair of pin joints spaced apart along the tilt axis and configured to provide the rotatable chassis with a rotational degree of freedom about the tilt axis.

3. The device of claim 2, wherein the tilt actuator comprises an extendable tilt jack, a first end of the extendable tilt jack pivotally coupled to the main chassis and an opposing second end of the extendable tilt jack pivotally coupled to the rotatable chassis.

4. The device of claim 3, wherein the main chassis comprises:

a pair of parallel horizontal frame portions configured to extend along a longitudinal axis of the main chassis on a support surface, the pair of parallel horizontal frame portions spaced apart on the lateral sides of the main chassis along the tilt axis; and a pair of corresponding parallel vertical frame portions, proximal ends of the pair of corresponding parallel vertical frame portions attached to the respective pair of parallel horizontal frame portions, the pair of pin joints mounted on respective opposing distal ends of the pair of parallel vertical frame portions.

5. The device of claim 4, wherein the extendable jack is configured to urge the rotatable chassis to rotate relative to the main chassis between a sitting position and a prone position, the upper sliding frame and the horizontal sliding frame extended parallel with the pair of parallel horizontal frame portions of the main chassis responsive to the rotatable chassis being in the prone position, the upper sliding frame and the horizontal sliding frame extended perpendicular to the pair of parallel horizontal frame portions of the main chassis responsive to the rotatable chassis being in the sitting position.

6. The device of claim 1, wherein the rotatable chassis comprises a pair of parallel guide poles extended along the first axis mounted on the lateral sides of the rotatable chassis, the upper sliding frame comprises a first pair of linear bushings mounted on lateral sides of the upper sliding frame, each linear bushing of the first pair of linear bushings slidable coupled to a corresponding guide pole of the pair of guide poles.

7. The device of claim 6, wherein the first actuator comprises a first extendable jack, a first end of the first extendable jack pivotally coupled to the rotatable chassis and an opposing second end of the first extendable jack pivotally coupled to the upper sliding frame.

8. The device of claim 7, wherein the horizontal sliding frame comprises a second pair of linear bushings mounted on lateral sides of the horizontal sliding frame, each linear bushing of the second pair of linear bushings slidably coupled to a corresponding guide pole of the pair of guide poles.

9. The device of claim 8, wherein the second actuator comprises a second extendable jack, a first end of the second extendable jack pivotally coupled to the rotatable chassis and an opposing second end of the second extendable jack pivotally coupled to the horizontal sliding frame.

10. The device of claim 8, wherein the horizontal sliding frame further comprises a pair of vertical guide poles extended along the second axis, the vertical sliding frame comprises a third pair of linear bushings mounted on lateral sides of the vertical sliding frame, each linear bushing of the third pair of linear bushings slidably coupled to a corresponding guide pole of the pair of vertical guide poles.

11. The device of claim 10, wherein the third actuator comprises a third extendable jack, a first end of the third extendable jack pivotally coupled to the horizontal sliding frame and an opposing second end of the third extendable jack pivotally coupled to the vertical sliding frame.

12. The device of claim 1, further comprising a fourth actuator coupled between the vertical sliding frame and the seat, the fourth actuator configured to drive a rotational motion of the seat relative to the vertical sliding frame about the rotational axis.

13. The device of claim 1, wherein the upper body fixing mechanism further comprises a cross belt, opposite ends of the cross belt attached to the lateral sides of the upper sliding frame, the cross belt is configured to be fastened across and over an upper body of the patient responsive to a patient positioned over the upper sliding frame.

14. The device of claim 1, further comprising a lower body fixing mechanism mounted on the vertical sliding frame, the lower body fixing mechanism comprising:

a pair of upper padded support members, each upper padded support member of the pair of upper padded support members extended along the tilt axis; and a pair of corresponding lower padded support members, each lower padded support member of the pair of corresponding lower padded support members extended along the tilt axis, the upper padded support members spaced apart from the lower padded support members along the second axis, wherein the pair of upper padded support members are positioned over a shin of a patient and the pair of lower padded support members are positioned under the shin of the patient, responsive to the patient positioned in the device.

15. The device of claim 14, wherein the pair of upper padded support members are slidably coupled to the vertical sliding frame, the pair of lower padded support members are slidably coupled to the vertical sliding frame, and the pair of upper padded support members and the pair of lower padded support members are slidable along the second axis relative to each other.

16. The device of claim 1, further comprising a control unit connected in signal communication with the tilt actuator, the first actuator, the second actuator, the third actuator, and the fourth actuator, the control unit comprising:

at least on processor;

at least one memory coupled to the at least one processor, the at least one memory configured to store a plurality of lumbar and knee recovery maneuvers in terms of two translational degrees of freedom along the first axis and the second axis and one rotational degree of freedom about the rotational axis, the at least one memory further configured to store executable instructions to urge the at least one processor to:

receive a lumbar and knee recovery maneuver of the plurality of lumbar and knee recovery maneuvers;

urge the upper traction assembly and the lower traction assembly to perform the received lumbar and knee recovery maneuver by at least one of:

urging the first actuator and the second actuator to move the upper sliding frame and the horizontal sliding frame relative to each other along the first axis based at least in part on the received lumbar and knee recovery maneuver;

urging the third actuator to move the vertical sliding frame relative to the horizontal sliding frame along the second axis; and urging a fourth actuator coupled to the seat to rotate the seat about the rotational axis relative to the vertical sliding frame.

17. The device of claim 16, wherein the control unit further comprises a user interface unit, the user interface unit configured to receive input data from a user, the input data comprising at least one lumbar and knee recovery maneuver form the plurality of lumbar and knee recovery maneuvers stored on the at least one memory.

18. A device for lumbar and knee recovery, the device comprising:

a rotatable chassis;

an upper traction assembly comprising an upper sliding frame; and an upper body fixing mechanism mounted on the rotatable chassis, the upper body fixing mechanism comprising:

a support bridge mounted across the upper sliding frame, the support bridge comprising two legs attached to and extended from the lateral sides of the upper sliding frame and a cross beam attached across distal ends of the two legs;

a pair of attachment points on the cross beam;

a pair of corresponding attach points on the lateral sides of the upper sliding frame; and a pair of belts mounted between the pair of attachment points on the cross beam and the pair of corresponding attach points on the upper sliding frame.

19. The device of claim 18, wherein:

the rotatable chassis is pivotally coupled to the main chassis;

the upper sliding frame slidably is mounted on the rotatable chassis, the upper sliding frame slidable relative to the rotatable chassis along a first axis, the first axis perpendicular to the tilt axis; and the pair of belts are configured to extend over respective shoulders going around respective armpits of a patient responsive to a patient positioned over the upper sliding frame.

* * * * *